(12) United States Patent
Mauro

(10) Patent No.: US 6,461,047 B2
(45) Date of Patent: Oct. 8, 2002

(54) ROTARY STAGE BEARING ARRANGEMENT

(76) Inventor: George Mauro, 28 Keewaydin Dr., Suite B, Salem, NH (US) 03079

( * ) Notice: Subject to any disclaimer, the term of this patent is extended or adjusted under 35 U.S.C. 154(b) by 17 days.

(21) Appl. No.: 09/791,073

(22) Filed: Feb. 22, 2001

(65) Prior Publication Data

US 2001/0048779 A1 Dec. 6, 2001

(51) Int. Cl.[7] ............................................. F16C 25/04
(52) U.S. Cl. ........................................ 384/206; 384/203
(58) Field of Search ................................ 384/192–194, 384/202, 203, 206, 208, 209, 228; 451/259, 285–289, 290, 398

(56) References Cited

U.S. PATENT DOCUMENTS

| 3,811,716 A | * | 5/1974 | Morzynsui ................. 403/204 |
| 5,314,491 A | * | 5/1994 | Thongpreda ................ 623/22 |
| 5,899,798 A | * | 5/1999 | Trojan ........................ 451/259 |

* cited by examiner

Primary Examiner—Matthew C Graham
Assistant Examiner—C. T. Bartz
(74) Attorney, Agent, or Firm—Davis & Bujold, P.L.L.C.

(57) ABSTRACT

A rotary stage having a rotary table mounted by a bearing on a shaft defining a table axis of rotation and supported on a base plate by an optically polished surface, the bearing comprising a ball bearing pre-loaded axially by an axially adjustable split ring in engagement with an annular chamfer on a race of the bearing to center the bearing relative to the table axis.

6 Claims, 1 Drawing Sheet

ROTARY STAGE BEARING ARRANGEMENT

This application claims benefit of Ser. No. 60/188,717 filed Mar. 13, 2000, and claims benefit of Ser. No. 60/196,683 filed Apr. 12, 2000.

FIELD OF THE INVENTION

This invention relates to an improved bearing system for a rotary stage.

BACKGROUND OF THE INVENTION

Typically, rotational stages consist of a rotor pivoted by two bearings mounted along the axis of a stationary shaft. Wobble is introduced to the rotating element due to the normal out-of-roundness of the balls in even the best of ball bearings. Typical out-of-round/out-of-size ball-to-ball in a high grade bearing is about 10 $\mu$-in. This results in a true-center wobble of 4 arc-seconds using a worm gear of 1 inch diameter. This transaxial wobble is usually acceptable. But, the axial wobble is a result of the compounding of the errors of both bearings, taken over the distance between the bearings. A stage which has a low profile will suffer greater axial error/wobble from the shortness of that distance.

OBJECT OF THE INVENTION

An object of the present invention is to overcome the problems associated with the prior art and to provide a device which improves the angular-wobble of the rotor four to eight fold, i.e. decreases the error from 20 arc sec. down to 1 arc sec. or better, while converting random wobble to smooth consistent deviation within the error noted.

SUMMARY OF THE INVENTION

According to the invention, there is provided a rotary stage comprising a rotary table mounted by an adjustable axial preloaded bearing on a shaft defining a table axis of rotation and supported on a base plate by an optically polished surface.

The polished surface may be formed on the rotor, on the base plate or on both of these. When a single said polished surface is utilized, the corresponding contacting surface may comprise three low friction (e.g. Teflon) pads symmetrically disposed about said axis. The mating polished surfaces, when used, may have air under pressure supplied between them to form an air bearing.

The bearing on the shaft may, for example, be a ball, air, roller, single point bearing.

The table may have an optically flat polished upper surface and may incorporate a worm gear for engagement with a worm to control rotation of the table about the axis.

Preferably the invention provides a rotary stage having a rotary table mounted by a bearing on a shaft defining a table axis of rotation and supported on a base plate by an optically polished surface, the bearing being pre-loaded axially by an axially adjustable split ring in engagement with an annular chamfer on a race of the bearing to center the bearing relative to the table axis.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
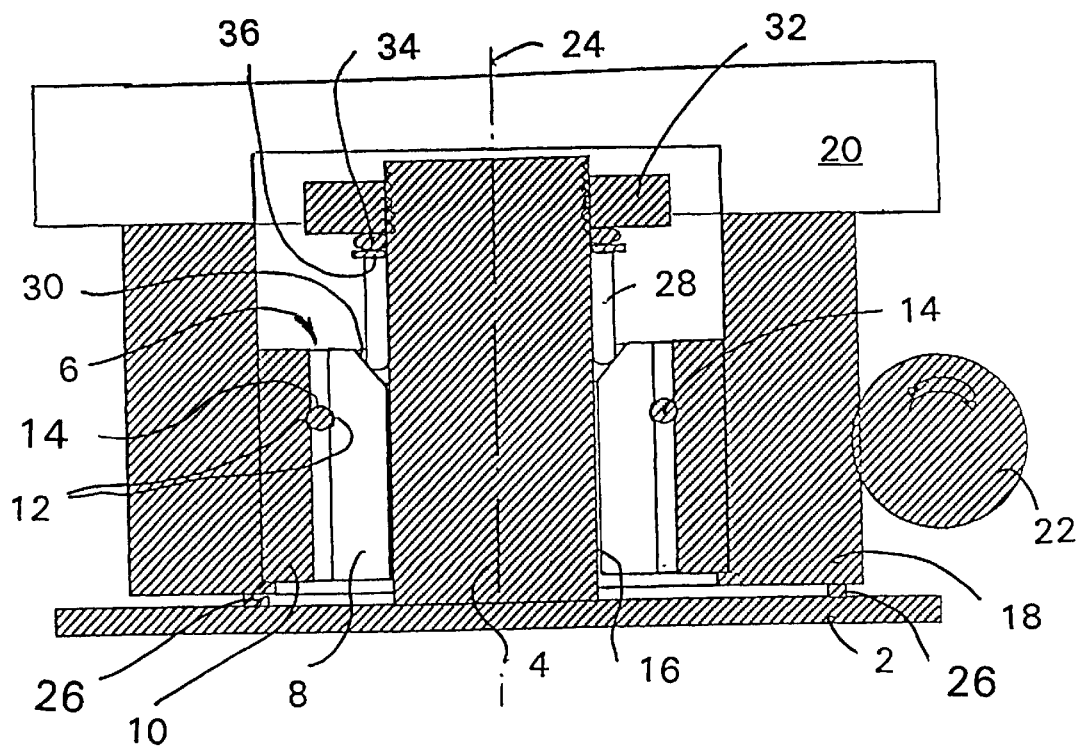
FIG. 1 is a diagrammatic cross-sectional elevation of a rotary stage including an adjustable axially preloaded bearing according to the present invention.
Figure 2:
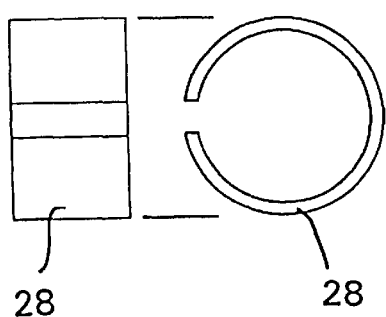
FIG. 2 is an elevation and plan view of a split bearing adjusting ring shown in FIG. 1.
Figure 3:
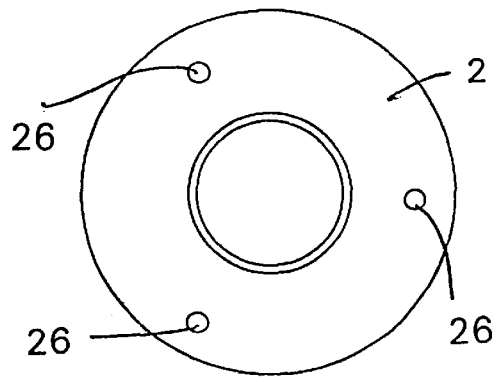
FIG. 3 is a plan view of a base shown in FIG. 1.

The invention including the best mode of known to the inventor, is disclosed in detail by the accompanying FIGS. 1, 2 and 3 and will now be described.

The basic design of the rotary stage of the present invention comprises a single ball bearing 6 (alternative bearings could be e.g. air, roller, single point) substantially centrally axially located on rotor 18, and a three point support pad arrangement 26 on either the underside of the rotor 18 or the upper side of base 2. The use of optical surfacing permits the achievement of a) superior flatness (1/4 wave, etc.) beyond the capability of machine grinding and b) a smooth bearing surface.

Base 2 is fast with a vertical shaft 4 surrounded by the ball bearing 6 comprising an inner race 8 and an outer race 10 defining annular facing ball housing grooves 12 captively retaining a plurality of ball bearings 14. An annular clearance 16 is provided between the shaft 4 and the inner race 8.

A rotary table supporting rotor 18 is fast with the outer race 10 and supports a rotary table 20 for rotation with rotor 18 by a worm 22 which engages worm gear teeth on the outer periphery of the ring 18.

The base 2 supports the rotor 18 for rotation about the axis 24 of the shaft 4 by means of the three circumferentially evenly spaced pads 26 (e.g. Teflon) equidistant from the axis 24.

A split ring 28 closely, but freely, surrounds the shaft 4 above the bearing 6. This split ring 28 engages an annular conical chamfer 30 in the upper end surface of the inner race 8 adjacent the shaft 4. Axial downward pressure is exerted on the split ring 28 by a nut 32, threaded onto the shaft 4, by way of a cushion spring 34 (O-ring, bellville washer, etc.) and a washer 36, to move the inner race 8 downwardly relative to the outer race 10 to preload the bearing 6 in an axial direction thereby accurately centering the bearing 6, ring 18 and table 20) relative to the shaft 4 and thus, axis 24.

The preload is constant once adjusted and eliminates radial and axial play in the bearing 6 while also providing the desired centering action referred to above.

In a variation the inner race is fast with the shaft and the split ring engages a chamfer in the outer race adjacent the ring 18 which has a clearance from the outer race. In this case the split ring 28 engages the ring 18.

Reference Numerals
2 base
4 shaft
6 ball bearing
8 inner race
10 outer race
12 grooves
14 ball bearings
16 clearance
18 table supporting rotor
20 table
22 worm
24 axis
26 pads
28 split ring
30 chamfer

32 nut
34 spring
36 washer

In the claims:

1. A rotary stage having a rotary table mounted by a bearing on a shaft defining a table axis of rotation and supported on a base plate by an optically polished surface, the bearing being pre-loaded axially by an axially adjustable split ring in engagement with an annular chamfer on a race of the bearing to center the bearing relative to the table axis, wherein the rotary table is supported on the base plate by three pads in engagement with the optically polished surface, equi-space about and equi-distance from the table axis.

2. The rotary stage of claim 1 wherein the split ring engages the annular chamber between the shaft and an inner race of the bearing.

3. A rotary stage having a rotary table mounted by a bearing on a shaft defining a table axis of rotation and supported on abase plate by an optically polished surface, the bearing being pre-loaded axially by an axially adjustable split ring in engagement with an annular chamfer on a race of the bearing to center the bearing relative to the table axis, wherein the pre-load is adjusted by a nut engaging a thread on the shaft applying pressure to the split right toward the annular chamber by way of a spring.

4. The rotary stage of claim 1 wherein the table is supported on the base plate by facing optically polished surfaces.

5. The rotary stage of claim 4 wherein, in use, an air bearing exists between the facing polished surfaces.

6. The rotary stage of claim 1 wherein a rotor is located intermediate the rotary table and the base plate, the rotor supporting the rotary table for rotation therewith and being the worm gear of a worm and worm gear drive for the rotary table.

* * * * *